Oct. 18, 1960    J. L. DICKERSON ET AL    2,956,818
PIPE COUPLING FOR REMOTE OPERATION
Filed Dec. 20, 1956    2 Sheets-Sheet 1
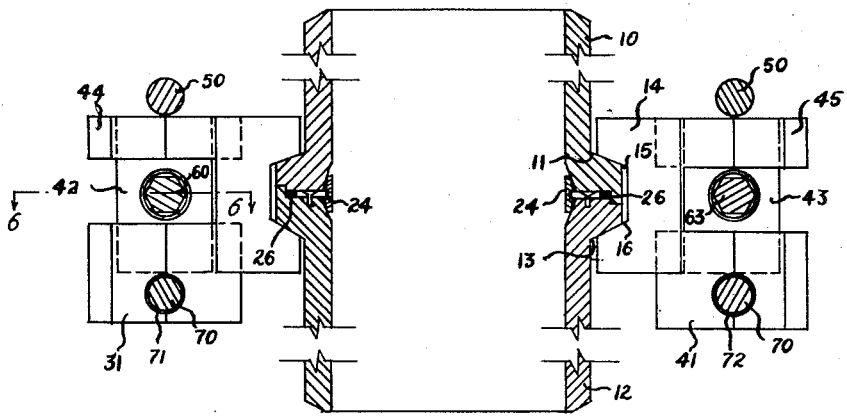
Fig. 1
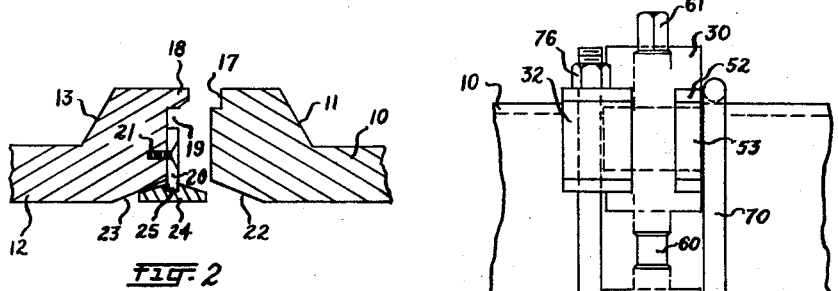
Fig. 2
Fig. 3
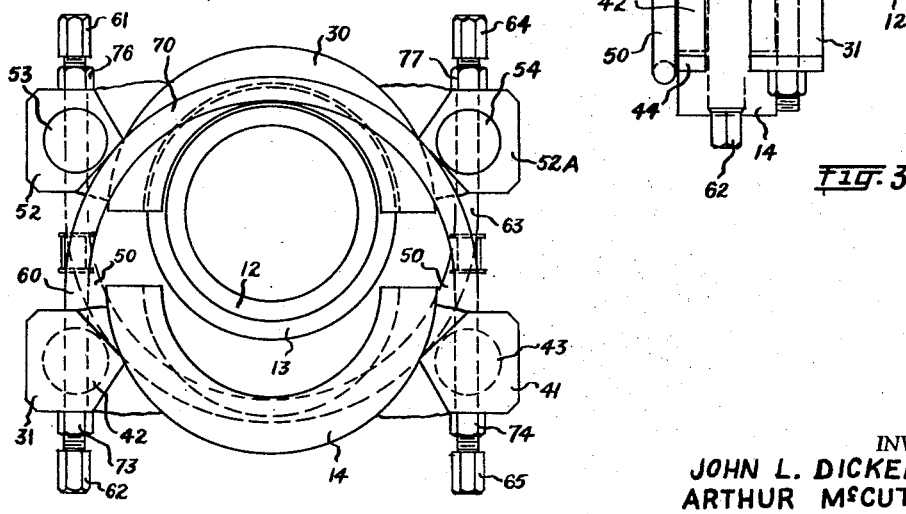
Fig. 4
INVENTORS
JOHN L. DICKERSON
ARTHUR McCUTCHAN
BY
W. E. Sherwood
ATTORNEY

United States Patent Office 2,956,818
Patented Oct. 18, 1960

2,956,818

PIPE COUPLING FOR REMOTE OPERATION

John L. Dickerson, Lyndon, and Arthur McCutchan, Louisville, Ky., assignors to Chemetron Corporation, a corporation of Delaware Filed Dec. 20, 1956, Ser. No. 629,584

5 Claims. (Cl. 285—18)

This invention relates to an improved pipe coupling and, more particularly, to a coupling suitable for ready connection or disconnection, from a remote control point, with pipes adapted to contain a medium under high temperature and pressure.

Various types of quick-disconnect pipe couplings are known, but in general such couplings, when advantageously designed for ready connection and disconnection, may have the disadvantages of requiring mounting at a given radial angle along the pipe axis, relatively unsatisfactory sealing, inability to permit relief of torsional stress in the pipe, expensive construction, limited life, or non-reusability. It is these and other disadvantages of conventional pipe couplings which the present invention is intended to overcome. These disadvantages, furthermore, are especially significant when the coupling is employed in heavy duty usages, such as under high temperatures, intense nuclear radiation, corrosive conditions, high pressures, or the like.

One object of our invention is to provide an improved pipe coupling having a self-sealing action.

Another object is to provide an improved pipe coupling which may be readily connected or disconnected from a remote control point.

Another object is to provide an improved pipe coupling which has a positive collar loosening action.

Another object is to provide an improved pipe coupling in which the coupling remains suspended upon a pipe end following completion of the pipe uncoupling operation.

A further object is to provide an improved pipe coupling with a selfpositioning collar actuating means.

A still further object is to provide an improved pipe coupling suitable for mounting at any radial angle with respect to the pipe axis.

A still further object is to provide an improved coupling permitting relief of torsional stress in the coupled pipes.

Other objects and advantages of our invention will be apparent from the following detailed description, read in conjunction with the accompanying drawings which show a presently preferred embodiment of the invention applied to a remotely operable quick-disconnect pipe coupling.

Fig. 1 of the drawings is a view partly in section on line 1—1 of Fig. 5 as extended, showing one portion of the coupling collar, and with the pipe ends and sealing means in fully sealed position.

Fig. 2 is a detail view showing the relation of the tapered pipe ends and sealing means prior to assembly of the coupling.

Fig. 3 is a side view, to a smaller scale, of the coupling mounted upon the pipe ends and showing the adhering of pipe ends.

Fig. 4 is an end view showing the coupling during the disconnecting operation and with the collar loosening means engaged with a pipe end.

Figure 5:
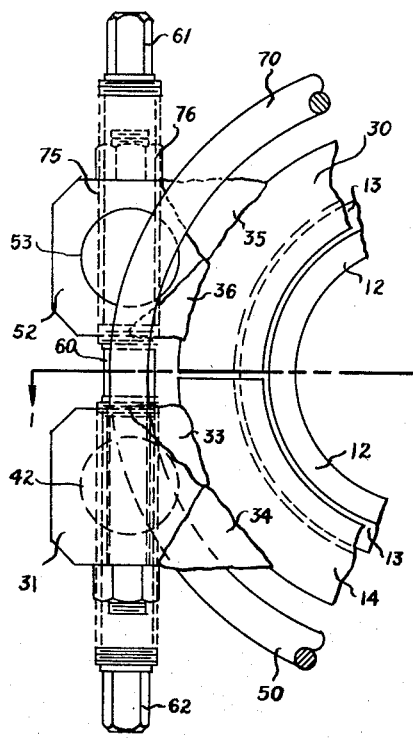
Fig. 5 is a partial end view, to a larger scale, of one side of the coupling in connected position.

In accordance with our invention, there is provided a pipe coupling, including two collar portions, which engage tapered ends of two pipes and pull the pipes into contact as the collar portions are pulled together. A metallic gasket is flexed into sealing position as the pipe ends are pulled together. A rotatable actuating means engages with bearing pins disposed in recesses in the supporting means or lugs on the collar portions and pulls the collar portions together when rotated in a first direction and forces them apart when rotated in a second direction. When rotated to a predetermined extent in the second direction the actuating means brings a collar loosening member into contact with a pipe end in order to loosen any collar portion which may remain frozen to the pipe ends and to permit the separation of the contacting ends of the previously coupled pipes. The actuating means is adapted for operation from a remote control point.

As best seen in Fig. 1, a pipe stub end 10, having an outwardly and rearwardly disposed tapered surface 11 is associated with a similar pipe stub end 12 having a similar tapered surface 13. Encompassing the pipe ends is a generally semi-circular collar portion 14, herein called the first collar portion for convenience. This collar is provided centrally of its width with a recess having tapered sides 15 and 16 adapted to contact the tapered surfaces 11 and 13 of the respective pipe ends. Preferably, one of the pipe ends is provided with a circumferential recess 17 (Fig. 2) into which a shoulder 18 on the cooperating pipe end is adapted to seat. The shoulder may have a depth axially of the pipes sufficient to provide a secondary sealing space 19 between the said pipe ends when the shoulder is fully seated in the recess. Within the secondary sealing space a primary seal locating ring 20 is mounted by any suitable means, as, for example, a screw 21 attached to the face of a pipe end.

On the inner face of the rim of each pipe end a tapered surface, such as surfaces 22 and 23, are provided, which surfaces, when the pipe ends are in the contact, form a primary sealing space. Within this primary sealing space an improved annular sealing ring or gasket 24 is mounted. This gasket is of the self-energizing type, preferably plated with a soft material to facilitate its seating with low contact pressures. As an example, it may be formed of nickel plated, stainless steel. On its central outer peripheral surface, the main sealing gasket 24 is provided with a groove 25 within which the locating ring 20 is positioned. The locating ring preferably is formed of two or more parts, constituting a split ring.

As a significant feature, the outer surfaces of the main sealing gasket are formed with a more acute angle relatively to the pipe axis than the angle formed by the tapered surfaces 22 and 23 on the pipe ends. As an example, a taper of about 14° on the sealing gasket and a taper of about 18°–26° on the pipe ends has been found to be satisfactory. Within the secondary sealing space 19, any suitable sealing means 26 may be used. For example, a conventional spiral-wound, asbestos inserted gasket or a profile serrated gasket or metal O-ring may be employed. When the respective pipe ends are pulled together in the manner later to be disclosed, the primary sealing ring 24 flexes into an outwardly bowed configuration forming a tight seal with pipe surfaces 22 and 23 and at the same time the secondary seal 26 is tightly compressed forming a backing seal. While the thus described sealing arrangement is preferred for heavy duty usages, it will be understood that our invention is not necessarily limited thereto. For less arduous duty the invention may comprise merely the sealing ring or gasket 24 employed with pipe ends having flat abutting faces.

Referring now to Fig. 5, the coupling collar is shown having a first generally semi-circular portion 14 and a second generally semi-circular portion 30. A collar supporting means is provided and may include lugs having suitable recesses for rotatably mounting separate toggle pins, two of the larger lugs 31 and 32 (see Fig. 3) being attached respectively to the first and second collar portions. Each lug is rigidly attached to its respective collar portion by any suitable means such as weld deposits 33, 34, and 35, 36. Moreover, each lug is provided with a bearing recess generally parallel to the pipe axis and into which a generally cylindrical toggle or bearing pin is rotatably mounted.

Figure 6:
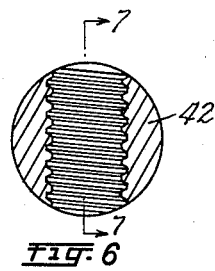
Fig. 6 is a sectional view of a representative threaded toggle or bearing pin taken on line 6—6 of Fig. 1 and with the collar actuating bolt removed.

A representative pin, 42 (Figs. 6 and 7) is provided with a threaded aperture extending transversely therethrough intermediate its ends, one pin of a cooperating pair having a right hand thread and the other pin of the pair having a left hand thread. As best shown in Fig. 1, the first portion 14 of the collar is provided with its larger lugs 31 and 41 arranged on opposite sides of the collar and having pins 42 and 43 seated therein. At the far ends of these pins, smaller lugs 44 and 45 are suitably affixed to the same collar, as by welding, and the pins are free to rotate and to employ a self-positioning action within their respective lug mountings. The smaller lugs 44 and 45 are relatively narrow, as shown in Fig. 1, and permit the cooperating collar loosening U-bolt 50 to occupy a position closely adjacent the ends of the pins, thereby to establish a compact coupling assembly.

As will be understood, the second collar portion 30 is likewise provided with a pair of larger lugs, one being shown at 32, similar to the type described, and with corresponding smaller lugs 52 and 52A. Likewise, pins 53 and 54 are mounted in the respective lugs of the second collar portion. However, the larger lugs of the first collar portion lie on one side of the abutting pipe ends while the bearing members of the second collar portion lie on the other side of those pipe ends.

As seen in Figs. 3 to 5, our coupling may be operated from a remote control position in the manner now to be described and due to the relation of the several parts constituting the coupling, it is unnecessary to establish any prior relationship of pipe ends or coupling in an angular direction, prior to the operation. An elongated clamping screw bolt 60, having any conventional means, such as heads 61 and 62 at its ends, for engagement with a remotely operable tool, passes through pins 42 and 53 and movably connects the collar portions on one side of the pipe axis. A second clamping screw bolt 63, having heads 64 and 65 for engagement by a tool, passes through pins 43 and 54 and movably connects the collar portions on the other side of the pipe axis. Adjacent their midpoints both screw bolts have smooth surfaces, and in one direction, for example, upwardly as seen in Figs. 4 and 5, both screw bolts have a left hand thread, the pins 53 and 54 also having left hand threads and being in threaded engagement with the respective screw bolts.

Figure 7:
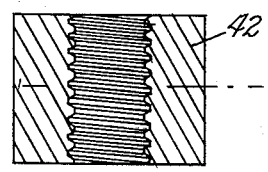
Fig. 7 is a sectional view of the pin of Fig. 6 taken on line 7—7 thereof, the dotted line showing a longitudinal axis of rotation of the pin.

In the other direction from those midpoints both screw bolts have right hand threads as do the pins 42 and 43, with which they are in threaded engagement. Rotation of screw bolt 60 in one direction from a given remote control point accordingly serves to move the collar portions toward each other and rotation in a second direction serves to move those collar portions apart. Likewise, rotation of the companion screw bolt 63 serves the same purpose. Each of the pins is free to rotate about its longitudinal axis, as seen in Fig. 7 and represented by the dotted line thereof and thus is self-positioning in the bearing recesses provided for the pins in the several lugs. Accordingly, the welding of the lugs to the collar portions need not be held to close tolerances and a relatively inexpensive coupling fabrication is possible. While the use of the thus described pins, each being threadedly engaged with a single screw bolt, is satisfactory for the average size of coupling, it will be understood that on large couplings a plurality of such screw bolts may be employed with each pin without departing from the invention. In such cases, the pin may be so cut as to provide a separate section for each bolt threaded therein so that the several bolts may act independently of each other in order to eliminate any tendency of the same to bind in the pin.

As a significant feature of our invention, means are provided for positively disconnecting the sealed pipe ends 10 and 12. Due to the efficient sealing provided under heavy duty usage, the pipe ends may remain sealed to each other after use and when screw bolts 60 and 63 are actuated to disconnect the collar portions from the pipe ends one of these collar portions may remain frozen to the pipe ends as shown in Figs. 3 and 4. Our invention provides a pair of U-bolts 50 and 70 encompassing a portion of the respective pipe ends and which engage with their associated pipe end when their associated clamping screw bolts have moved to a predetermined uncoupling position.

These U-bolts preferably have a configuration just large enough to clear the stub ends of the pipes when the coupling is fully uncoupled, thus permitting the mounting of the coupling upon the pipes.

The larger lugs 31 and 41 attached to the first collar portion 14 are provided with apertures 71 and 72, respectively, receiving the lower ends of U-bolt 70 with a suitable engagement. The extreme ends of that bolt are threaded for engagement with nuts 73 and 74 tightened against the outer surfaces of the respective larger lugs. The U-bolt 70, moreover, lies in a plane outboard from the enlarged end of pipe 12, as seen in Fig. 1.

Similarly, the larger lugs attached to the second collar portion 30 are provided with apertures, one being shown at 75 in Fig. 5, receiving the upper ends of a similar U-bolt 50 with a suitable engagement. The extreme ends of that bolt are threaded for engagement with nuts 76 and 77 (Fig. 4) tightened against the outer surfaces of the respective larger lugs. The U-bolt 50 likewise lies in a plane outboard from the enlarged end of pipe 10, but on the opposite side from U-bolt 70, as will be noted in Fig. 1.

When, during the uncoupling of the pipe ends, the rotation of screw bolts 60 and 63 reaches a predetermined point and the second collar portion 30 remains frozen in place (Figs. 3 and 4), further rotation of the screw bolts brings U-bolt 70 into contact with the pipe ends 12 and causes the separation of the collar portion 30 from the pipe end 12. Likewise, if the first collar portion 14 should remain frozen in place, U-bolt 50 contacts pipe end 10 and causes the separation of the collar portion 14 from the pipe end 10. When employing the coupling in special environments such as in a field of nuclear radiation, it is frequently important that the detached coupling remain attached to the uncoupled pipe ends. In our invention, either U-bolt 50 or U-bolt 70, which encircles a pipe end beyond the enlarged region thereof, will act as a support for the entire coupling which remains accessible by loosely hanging on that pipe end.

Figure 8:
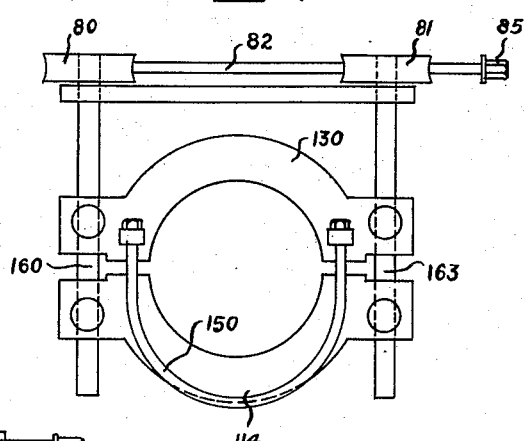
Fig. 8 is an end view of a modified remotely controlled actuating means.
Figure 9:
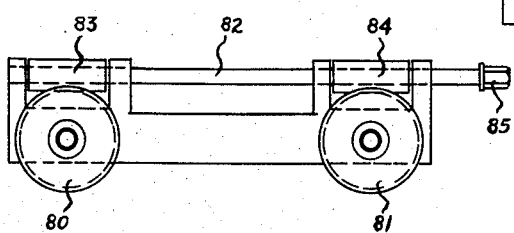
Fig. 9 is a top view of the actuating means shown in Fig. 8.

As thus described, the apparatus is coupled or uncoupled by successive manipulations of two screw bolts. It is, however, within the purview of the invention to provide for actuation from a single control point. One such arrangement is noted in Figs. 8 and 9, wherein a first collar portion 114 cooperates with a second collar portion 130 in the manner above described. A pair of clamping screw bolts 160 and 163 carry worm gears 80 and 81 at one of their ends. A drive shaft 82 having worms 83 and 84 engaging with the respective worm gears is adapted to be rotated by means of a drive nut 85 with which a remotely operated tool is engaged. The screw bolts are engaged in swivelled toggle or bearing pins carried by the respective collar portions as above described. Likewise, collar loosening U-bolts of the type described are also provided, one being shown at 150.

With the foregoing in mind, it will thus be seen that in contrast to various known types of quick-disconnect couplings the ends of the pipes and the coupling collar portions of our invention do not require a prescribed mounting at a predetermined radial angle along the pipe axis. The improved coupling functions equally well when mounted at any radial angle of the pipe stub ends. Moreover, when coupled, one or both pipes may rotate a limited distance with respect to the coupling or to each other without impairing the sealed coupling. For example, expansion of pipe lines may cause torsional stresses which can thus be relieved by relative movement of pipe ends 10 and 12 without adversely affecting the sealed coupling.

The operation of the structure will be obvious from the foregoing description and may briefly be described as follows. With the pipe ends slightly spaced apart as seen in Fig. 2 and with the coupling collars loosely surrounding the enlarged ends of the pipes, the respective clamping screw bolts 60 and 63 are turned, preferably simultaneously, to close the coupling. As the tapered surfaces 15 and 16 of collar portion 14 engage the tapered surfaces 11 and 13 of the pipe ends (similar tapered surfaces of collar portion 30 also engaging their pipe ends), the pipe ends are pulled together until their faces contact. As this occurs, the primary sealing ring or gasket 24 flexes and tightly engages tapered surfaces 22 and 23 on the pipe ends. However, this gasket does not support the load of the clamping screws, which loading is much heavier, and thus within limits performs independently of the screw load applied. As a result, the gasket is less affected by line bending moments and will permit rotational slippage of the pipe ends whenever a sufficient torsional stress builds up in those pipe ends. The secondary seal 26 is compressed as the pipe ends are pulled together and presents no obstacle to rotational slippage of the pipe ends.

When the sealed coupling is to be disconnected, rotation of the clamping screw bolts in the opposite direction normally disengages the first and second collar portions. If, however, one collar portion freezes to the pipe ends, the appropriate U-bolt functions to separate that collar portion from the pipe ends.

While we have shown a particular embodiment of the invention it will be understood, of course, that we do not wish to be limited thereto, since many modifications can be made; and we, therefore, contemplate by the appended claims to cover any such modifications as fall within the true spirit and scope of our invention.

What we claim as new and desire to secure by Letters Patent of the United States, is:

1. A quick-disconnect pipe coupling comprising a split annular collar having separate first and second portions, said portions being formed for engagement with the ends of the pipes to be coupled and for drawing said ends axially into abutting engagement, collar supporting means, including a pair of spaced lugs rigidly affixed to each of said collar portions adjacent each of the extremities of each of those collar portions and having a bearing recess within each lug, a self-positioning bearing pin rotatably mounted in the recesses of and extending between the lugs in each of said lug pairs, a pair of rotatable collar actuating members disposed respectively on opposite sides of said collar with one of said members extending between and movably engaging a pair of said pins on one side of said collar and the other of said members extending between and movably engaging a pair of pins on the other side of said collar, each of said actuating members engaging its cooperating pins intermediate the ends of the pins and being operable through its engagement therewith to move said first and second collar portions toward each other when rotated in a first direction and to move the same apart when rotated in a second direction, and collar loosening means mounted upon one of said collar portions and having a pipe engaging portion in encircling relation to at least one of the pipe ends, said collar loosening means engaging its encircled pipe end on the side of the pipe end opposite the side on which said collar loosening means is mounted and with its pipe engaging portion being operable to separate the companion collar portion on which the collar loosening means is not mounted, from the encircled pipe end when said collar actuating members are rotated to predetermined position in said second direction.

2. A pipe coupling as defined in claim 1 wherein said collar loosening means comprises a dual arrangement including a first pipe engaging portion mounted upon said first collar portion and a second pipe engaging portion mounted upon said second collar portion, each of said pipe engaging portions being mounted in encircling relation to a separate one of the pipe ends.

3. A pipe coupling as defined in claim 2 wherein each of said first and second pipe engaging portions engages the respective pipe end disposed on the same side of the coupling as the mounting for the respective pipe engaging portion.

4. In a pipe coupling comprising in combination, a split annular collar having separate first and second portions, said portions being formed for engagement with the ends of the pipe to be coupled and for drawing said ends axially into abutting engagement, collar supporting means including a lug mounted upon each of said first and second portions of said collar adjacent each end of each of said collar portions and with a self-positioning bearing pin rotatably mounted in each lug, and rotatable means engaging with a bearing pin on each of said collar portions for moving said collar portions toward each other when rotated in a first direction and for moving said collar portions apart when rotated in a second direction; the improvement comprising means for positively disengaging said collar portions from said pipe ends and comprising a pair of pipe engaging members, one of said members being mounted at one end upon said first collar portion and the other of said members being mounted at one end upon said second collar portion, each of said members having a pipe engaging portion extending in encircling relation to a separate one of said pipe ends and adapted to engage that pipe end on a side opposite to the side from which said member is mounted on its collar portion whereby upon movement of said rotatable means to a predetermined position in said second direction with either of said collar portions frozen to one of said pipe ends, the pipe engaging member mounted upon an unfrozen collar portion will engage its respective encircled pipe end to separate its companion frozen collar therefrom.

5. A pipe coupling as defined in claim 4 having each of said pipe engaging members disposed outboard of the abutting junction of said pipe ends, said members being mounted from said pipe junction at a distance sufficiently far to permit the detached coupling to remain suspended by means of one of the encircling pipe engaging portions upon at least one pipe end following disengagement of said pipe ends and said collar portions and after axial separation of the disengaged pipe ends.

References Cited in the file of this patent

UNITED STATES PATENTS

| | | |
|---|---|---|
| 1,376,216 | Mittinger | Apr. 26, 1901 |
| 1,681,381 | Tolman | Aug. 21, 1928 |
| 1,802,015 | Hays et al. | Apr. 21, 1931 |
| 2,324,538 | Robinson | July 20, 1943 |
| 2,353,572 | Kuster et al. | July 11, 1944 |
| 2,433,289 | Morris | Dec. 23, 1947 |
| 2,485,834 | Lock | Oct. 25, 1949 |
| 2,635,900 | Mayo et al. | Apr. 21, 1953 |
| 2,699,343 | Troeger et al. | Jan. 11, 1955 |
| 2,766,829 | Watts et al. | Oct. 16, 1956 |

FOREIGN PATENTS

| | | |
|---|---|---|
| 538,523 | Italy | Jan. 26, 1956 |